Nov. 26, 1968     S. C. BAKER     3,412,753

RELIEF VALVE CARTRIDGE

Filed Oct. 23, 1965

Inventor

Stephen C. Baker

By: Olson, Trexler, Wolters, & Bushnell

United States Patent Office 3,412,753
Patented Nov. 26, 1968

3,412,753
RELIEF VALVE CARTRIDGE
Stephen C. Baker, Hinsdale, Ill. (% Ste-Art Co.,
1611 S. Newberry Ave., Chicago, Ill. 60608)
Filed Oct. 23, 1965, Ser. No. 503,161
6 Claims. (Cl. 137—490)

ABSTRACT OF THE DISCLOSURE

A relief valve in cartridge form consisting of a first stage and a second stage relief valve. The first stage relief valve and the second stage relief valve, as well as the cartridge body, are all substantially centered on the same longitudinal axis. The first stage relief valve operates when a predetermined pressure is exceeded at the inlet pipe. Operation of the first stage relief valve results in the interior of a poppet valve of the second stage being at the same pressure as in the discharge pipe. This results in a pressure differential across the poppet valve, and if this pressure differential is sufficient to overcome the force of a biasing spring, the second stage relief valve will open thereby permitting high pressure fluid to flow freely from the inlet pipe to the discharge pipe until excess pressure at the inlet has been sufficiently dissipated. At this time the second stage relief valve will close, followed by closing of the first stage relief valve.

---

This invention relates to a relief valve, and more particularly to a relief valve cartridge.

Relief valves of various designs are well known. Some of the known relief valves are of the two-stage or pilot operation type. Prior art relief valves which provide for two-stage or pilot operation are usually bulky devices which are not easily installed. In locations where space and weight are at a premium, such as in aircraft, the inefficiency of the bulky prior art relief valves is particularly apparent.

Two-stage or pilot operation relief valves must have the various components of the valve precisely positioned and aligned, so that the relief valve will function properly. In order to obtain this precise alignment, the various components of prior art relief valves must be machined to close tolerances. Two-stage relief valves, in addition to expensive machining, require that the fitting which is utilized to mount the valve in the system be of a special design for the valve.

An object of the present invention is to provide a compact and easily installed two-stage relief valve.

Another object of the present invention is to provide a relief valve which does not require machining to close tolerances and is therefore relatively inexpensive to make.

Another object of the present invention is to provide a relief valve in which the various components of the valve become automatically aligned.

Another object of this invention is to provide a relief valve which is usable with a standard type fitting.

For a fuller understanding of the nature and objects of the invention, reference should be had to the following detailed description, taken in connection with the accompanying drawings, wherein.

Figure 1:
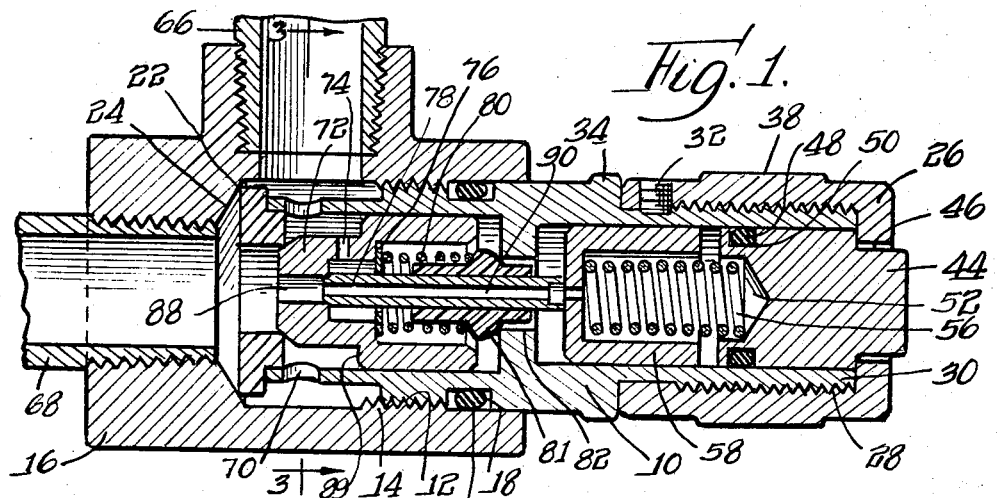
FIGURE 1 is a longitudinal sectional view of the valve in its closed position.
Figure 2:
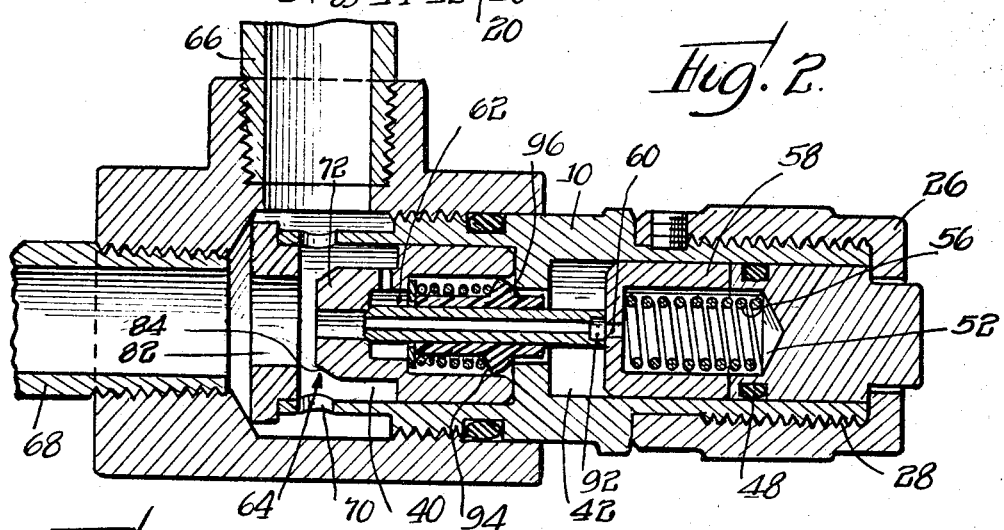
FIG. 2 is a longitudinal sectional view of the valve wherein both stages are open.

Referring now to the drawings in greater detail, a sectional view of a body portion 10 of the relief valve is shown in FIGS. 1 and 2. The body portion 10 has threads 12 which engage the threads 14 of a fitting 16. In addition to the threads 12, the body portion also has a recess 18 which receives the O-ring 20 which seals the body portion 10 in the fitting 16 when the threads on the body portion are turned into the threads 14 of the fitting. A seat 22 on the forward portion of the body is seated against a sloping surface 24 of the fitting 16.

The opposite end of the body member is enclosed in a thimble 26 which has interior threads 28 which mate with the threads 30 on the body member 10. The thimble 26 is retained in position against undesired rotation and unthreading by a set-screw 32. The thimble when placed in position adjoins a hexagonal shaped surface 34 of the body member 10. It will be apparent that the body 10 of the cartridge may be screwed into the fitting by merely grasping the hexagonal shaped surface 34 with a wrench and turning the body member relative to the fitting. The seat 22 will engage the sloping surface 24 and provide a seal between the fitting and the forward end of the cartridge. Since the surface 24 is sloping, it is apparent that the exterior dimension of the seat 22 may vary in diameter and still form a tight seal with the sloping surface 24. When the relief valve cartridge has been installed, as shown in FIG. 1, the thimble 26 may be easily removed or adjusted, after loosening the set screw 32, by turning the thimble by means such as a wrench gripping a hexagonal shaped surface 38 of the thimble.

There are two chambers 40 and 42 in the body member 10 (see FIG. 2). The forwardmost chamber 40 encloses the two-stage or pilot operation relief valve mechanism, while the rear chamber 42 encloses a spring mechanism. The operation of the two-stage relief valve and the spring mechanism will be explained more fully later. A plug 44 in the rear chamber 42 projects through an aperture 46 at the end of the thimble 26. The plug 44 is held in sealing engagement with the sidewalls of the chamber 42 by an O-ring 48 which is placed in a groove 50. The forward surface of the plug 44 has a spring seat 52 machined therein. A spring 56 is seated in the spring seat 52 of the plug 44 and presses against a piston 58. It should be noted that the spring seat 52 and the interior of the piston 58 provide an enclosure for the spring and limit the amount which the spring can be compressed (see FIG. 2). If the thimble 26 is displaced toward the rear of the body member 10 (to the right in FIGS. 1 and 2) it will be apparent that the piston 58 will have a greater range of travel and that the spring 56 will not exert as much force against the top of the piston 58. Thus, the force which the piston 58 exerts on the relief valve mechanism may be controlled by adjusting the position of the thimble 26. It should be noted that the piston 58 has an orifice 60 in the upper surface of the piston so that the fluid which is entrapped by the body of the piston 58 may escape when the piston moves from the position shown in FIG. 1 to the position shown in FIG. 2.

The forward chamber 40 contains a first stage relief valve mechanism, indicated generaly at 62, and a second stage relief valve mechanism indicated generally at 64. The fluid from a high pressure source enters the fitting through an inlet pipe 66. The fluid flow is controlled by the two relief valves which open, when excess pressure is present, to permit the fluid to flow out the discharge pipe 68.

The relief valve is normally in the position shown in FIG. 1, wherein both stages 62 and 64, of the relief valve, are closed. In this position there is no flow of fluid from the inlet pipe 66 to the discharge pipe 68. The high pressure fluid from the inlet pipe 66 enters the fitting 16, but is prevented from flowing out the discharge pipe 68 by the seat 22 of the relief valve cartridge. The high pressure fluid will enter radial apertures 70 in the body member 10. The fluid will completely surround a poppet valve 72 and will press against the surfaces of the poppet valve. The fluid will also enter a radial aperture 74 in the poppet valve 72 and will exert a pressure on the interior surface of the poppet valve. A washer 76, seated in the poppet valve 72, has an inside diameter which is larger than the outside diameter of a tube 78. Thus, the high pressure fluid will completely fill the forward chamber 40 of the relief valve cartridge. A seal 81, in a bore 82, between the two chambers 40 and 42 prevents the flow of fluid from the chamber 40 into the chamber 42.

The poppet valve 72 will not be displaced by the high pressure from the inlet pipe 66, since both the interior and exterior surfaces of the poppet valve will be subject to the force of the high pressure fluid in the chamber 40. In addition, the motion of the poppet valve 72 is resisted by the spring 80 which presses against the seal 81 and the washer 76 to force the poppet valve toward the forward end of the cartridge and into sealing engagement with the relief port 82. It should be noted that the forward surface 84 of the poppet valve 72 is in sealing engagement with the interior edge of the relief port 82. The sloping surface 84 of the poppet valve is seated against the interior surface of the relief port 82. If the outer diameter of the poppet valve 72 is not machined to precise tolerances the valve will still seal since the sloping surfaces 84 will seat themselves on the interior surface of the relief port 82.

Figure 3:
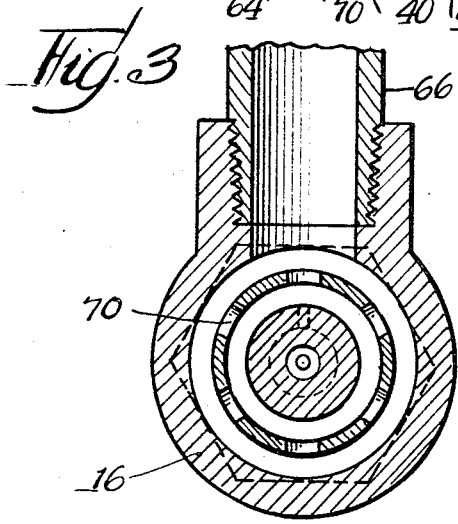
FIG. 3 is a cross-sectional view of the valve along the lines 3—3 of FIG. 1.

The first stage relief valve 62 is located within the poppet valve 72 of the second stage 64. The first stage relief valve consists primarily of the tube 78. The tube is forced into sealing engagement with the forward interior surface of the poppet valve 72, as shown in FIG. 3 by the dotted lines. The forward end of the tube 78 has a sloping surface 86 (FIG. 4) which seals against a relief port 88 in the poppet valve 72. The tube 78 is pressed against the relief port 88 by the spring 56 and the piston 58 in the rear chamber 42. The forward surface 86 of the tube 78 seals itself against the relief port 88 in much the same manner as has been described for the sloping surface 84 of the poppet valve 72. Again it should be noted that the characteristics of the seal formed at the relief port are such that precise machining of the tube 78 is not required in order to have a tight seal.

The tube 78 has a passage 90 through the center of the tube. The passage 90 connects the outlet pipe 68 with the rear chamber 42 through a slot 92 formed in the rear end of the tube 76. Thus, the fluid pressure in the rear chamber 42 will be the same as in the discharge pipe 68. Since the piston 58 has an orifice 60, the interior portion of the piston 58 will also be at the same fluid pressure as is present in the outlet pipe 68.

As previously stated, when the relief valve is in the position shown in FIG. 1, there will be no fluid flow between the inlet pipe 66 and the outlet pipe 68. The relatively high pressure fluid entering the fitting 16 through the inlet pipe 66 will surround the tube 78 after having passed through the apertures 70 and the relatively small aperture 74. The surface 86 of the tube member 78 will be subjected to a rearward force component as a result of the fluid pressure on the surface 86. This rearward force component will be opposed by the force of the spring 56 which acts through the piston 58 to apply force to the rear end of the tube member 78. When the inlet pressure is sufficiently great so that the rearward component of force on the sloping surface 86 exceeds the spring force the tube 78 will be displaced in a rearward direction.

Figure 4:
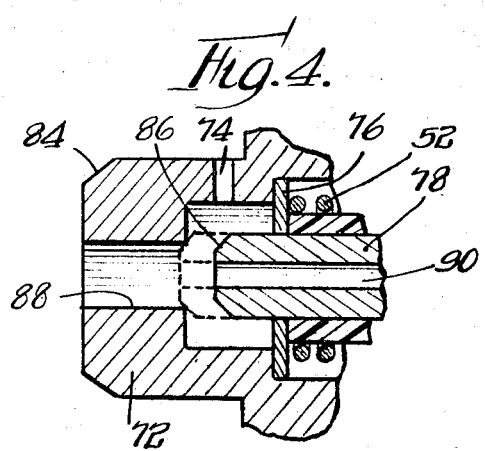
FIG. 4 is a fragmentary, longitudinal sectional view of the relief port for the first stage relief valve.

When the tube 78 is displaced rearwardly, the relief port 88 will become open, as shown in FIG. 4. When the relief port 88 is opened the high pressure fluid in the interior of the poppet valve 72 will flow out the relief port 88 to the low pressure outlet. The interior of the poppet valve 72 will drop in pressure to a pressure equal to that in the outlet pipe 68. The relatively small aperture 74 is smaller in cross-sectional area than the effective opening in the relief port 88. Thus, there will be a pressure differential across the aperture 74, since the interior of the poppet valve 72 will be at the relatively low pressure of the discharge pipe 68, while the exterior of the poppet valve will be surrounded by fluid at the relatively high pressure of the inlet pipe.

There will be a pressure differential between the interior and the exterior surfaces of the poppet valve 72. The relatively high pressure on the exterior surfaces 84 and 89 of the poppet valve 72 will tend to force the poppet valve to the rear of the forward chamber 40. However, this rearwardly acting force component of the high pressure fluid on the exterior surface of the poppet valve 72 will be resisted by the spring 80. If the pressure differential between the outer surface of the poppet valve and the inner surface of the poppet valve is sufficiently great so that the rearward force of the high pressure fluid on the outer surface of the poppet valve exceeds the forward force exerted by the spring 80, the poppet valve will be displaced to the rear of the chamber 40 (see FIG. 2). When the poppet valve 72 is displaced to the position shown in FIG. 2, the high pressure fluid of the inlet pipe 66 will flow directly through the aperture 70 and the relief port 82 to the discharge pipe 68. It should be noted that the interior of the rear chamber 42 will remain at the same pressure as in the discharge pipe 68, since the central passage 90 of the tube member 76 provides for a fluid connection between the interior of the rear chamber 42 and the discharge pipe 68.

From the foregoing description, it will be seen that when a condition of excess pressure occurs at the inlet 66 to the fitting 16, the first stage relief valve 62 will open. If the excess pressure is sufficiently great, the second stage relief valve 64 will then open. Once the second stage relief valve is open, the fluid pressure inlet pipe will have easy access to the discharge pipe 68.

As the fluid continues to flow from the inlet pipe 66 to the discharge pipe 68, the pressure at the inlet pipe will gradually decrease. When the inlet pressure has decreased to such a value that the rearward force component on the exterior surface of the poppet valve 72 no longer exceeds the forward force component of the spring 80, the poppet valve 72 will be closed. After the poppet valve 72 closes, the flow from the inlet 66 will continue at a greatly reduced rate through the aperture 74, the relief port 88, relief port 82 and out the discharge pipe 68. When the excess pressure at the inlet has been completely dissipated, the rearward force component on the surface 86 of the tube member 78 will be unable to overcome the forward force component exerted by the spring 56 and piston 58 on the tube 78. When this condition occurs, the first stage relief valve 62 will also close.

The seal 81 remains stationary in the aperture 82 between the two chambers 40 and 42. The seal 81 is retained in this position by the spring 80 which presses on the forward surface 94 of the seal 81. When the first stage relief valve is operated, the tube 78 will move relative to the seal which surrounds it. The seal 80 could be dispensed with if the aperture 82 were machined to a close tolerance to fit the outer surface of the tube 78. However, by having the seal 81 an expensive machining operation is eliminated. In addition, the seal 81, due to its sloping rear surface 96, permits the tube 78 to be installed in a slightly eccentric position relative to the longitudinal axis of the relief valve cartridge. Thus, the seal 81, in addition to reducing machining costs, provides flexibility between the first and second stage relief valves, so that a precise positioning of the various components of the two relief valves is not required.

From the foregoing description, it will be apparent that the relief valve cartridge consists of a first and second stage relief valve. The first stage relief valve, the second stage relief valve and the cartridge body are all substantially centered on the same longitudinal axis. The first stage relief valve will operate when a predetermined pressure is exceeded at the inlet pipe 66.

The pressure at which the first stage relief valve 62 operates may be adjusted by moving the thimble 26 relative to the body member 10. Moving the thimble 26 rearwardly will increase the amount of travel space provided for the piston 58 and will consequently decrease the compressive displacement on the spring 56. When the compressive force of the spring 56 is reduced, the first stage relief valve 62 will open at a smaller pressure differential between the inlet pipe 66 and the discharge pipe 68. Conversely, moving the thimble 26 forward in the body member 10, will increase the pressure differential required between the inlet and discharge pipes, to cause the first stage relief valve to open.

The operation of the first stage relief valve will result in the interior of the poppet valve 72 of the second stage being at the same pressure as is present in the discharge pipe 68. Since the exterior of the poppet valve 72 will be at the same pressure as is present at the inlet pipe 66, there will be a pressure differential across the poppet valve. If this pressure differential is sufficient to overcome the predetermined force of the spring 80, the second stage relief valve 64 will open. The high pressure fluid will then flow freely from the inlet pipe 66 through the apertures 70 out of the relief port 82 to the discharge pipe 68. When the excess pressure at the inlet has been dissipated sufficiently, the second stage relief valve 64 will close first and then the first stage relief valve 62 will close.

The components of the first and second stage relief valves are all positioned on the same longitudinal axis as the body member 10. Due to the characteristics of the seals formed at the relief ports of the relief valves, i.e., a sloping surface contacting a circular edge, the diameters of the various components of the two relief valves need not be machined to precise tolerances. Also, this manner of positioning the various components of the two valves when used in conjunction with a sealing member 80 permits the various component of the two relief valves to be positioned slightly off-center without having any detrimental effect on the operation of the two relief valves. Thus, precise and expensive machining in the manufacture of the relief valve cartridge is held to a minimum. With the relief valve cartridge designed as shown in FIG. 1, the threads 12 on the exterior cartridge can be positioned and cut to suit any desired standard fitting for the cartridge. In addition to being adaptable to any standard pipe fitting, the relief valve cartridge is, due to its longitudinally coaxial design, extremely compact.

While particular embodiments of the invention have been shown, it should be understood that the invention is not limited thereto, since many modifications may be made; and it is, therefore, contemplated to cover by the appended claims any such modifications as fall within the true spirit and scope of the invention.

What is claimed is:

1. A relief valve cartridge assembly comprising a body member, at least two chambers in said body member, the longitudinal axes of said chambers being substantially coaxial with the longitudinal axis of said body member, first and second relief valve means in a first one of said chambers, the longitudinal axes of said first and second relief valve means being substantially coaxial with the longitudinal axis of said body member, said first relief valve means being located radially inward of said second relief valve means and said first relief valve means operatively interconnecting said first chamber with a second chamber, there being a first aperture means through said body member, and a second aperture means in said second relief valve means, said first and second aperture means providing fluid communication between said first relief valve means and the exterior of said body member, said first relief valve means being held in a position sealing the relief port means for said first relief valve means by a first spring means located in said second chamber, and said second relief valve means being held in sealing engagement with relief port means for said second relief valve means by a second spring means located in said first chamber.

2. The relief valve assembly as set forth in claim 1 wherein the longitudinal axis of the relief port means for both said first and said second relief valve means are substantially coaxial with the longitudinal axis of said body member.

3. A relief valve assembly as set forth in claim 1 wherein passage means in said first relief valve means operatively connects said second chamber with the exterior of said body member through the relief port means for said first and second relief valve means.

4. A relief valve assembly as set forth in claim 1 wherein sealing means is located radially exteriorly of said first relief valve means, the longitudinal axis of said sealing means being substantially coaxial with the longitudinal axis of said body portion, and said sealing means being pressed into sealing engagement with an aperture between said first and second chambers by said second spring means.

5. A relief valve cartridge assembly comprising a substantially cylindrical body member; first and second chambers in said body member; said first chamber having a tubular shaped first relief valve means; one end of said first relief valve means projecting into said second chamber, the opposite end of said first relief valve means being seated in sealing engagement with a first relief port in a second relief valve means; said first relief valve means being held in said sealing engagement with said relief port by first spring means in said second chamber; said second relief valve means being seated in sealing engagement with a second relief port located in said body member, said second relief valve means being held in sealing engagement with said second relief port by a second spring means; seating means for sealing said body member in a fitting means, said seating means being located radially outward of said second relief port; the longitudinal axes of said body member, said first and second chambers, said first and second relief valve means, said first and second relief ports, said seating means for said body member, and said first and second spring means all being substantially coaxial; longitudinal passage means in said first relief valve means interconnecting said second chamber, through said first and second relief ports, to the exterior of said body member; first aperture means in said body portion; second aperture means in said second relief valve means; said second aperture being smaller in cross-sectional area than said first aperture, and also smaller in cross-sectional area than said first relief port; said first and second apertures providing fluid communication between said first relief valve means and the exterior of said body member and said first and second relief valve means; and said spring means, being constructed such that said first relief valve means opens, to relieve excess pressure, before said second relief valve means opens.

6. A relief valve assembly according to claim 5, wherein an aperture connecting said first and second chambers is sealed by sealing means located radially outwardly of said first relief valve means.

References Cited

UNITED STATES PATENTS

| 1,209,753 | 12/1916 | Phillips | 251—38 XR |
| 1,217,792 | 2/1917 | McConnell et al. | 251—38 |

M. CARY NELSON, *Primary Examiner.*

ROBERT J. MILLER, *Assistant Examiner.*